(12) United States Patent
Newberg

(10) Patent No.: US 6,601,823 B2
(45) Date of Patent: Aug. 5, 2003

(54) SANITARY DRAIN VALVE DESIGN

(75) Inventor: Douglas A. Newberg, Plainsboro, NJ (US)

(73) Assignee: NL Technologies, Ltd., Gambrills, MD (US)

( * ) Notice: Subject to any disclaimer, the term of this patent is extended or adjusted under 35 U.S.C. 154(b) by 0 days.

(21) Appl. No.: 10/290,542

(22) Filed: Nov. 8, 2002

(65) Prior Publication Data

US 2003/0062503 A1 Apr. 3, 2003

Related U.S. Application Data

(62) Division of application No. 09/801,783, filed on Mar. 9, 2001, now Pat. No. 6,491,283.
(60) Provisional application No. 60/187,996, filed on Mar. 9, 2000.

(51) Int. Cl.[7] .................................................. F16K 1/46
(52) U.S. Cl. ........................ 251/144; 251/214; 251/330; 251/339; 251/335.1
(58) Field of Search ................................ 251/144, 214, 251/330, 339, 335.1

(56) References Cited

U.S. PATENT DOCUMENTS

| | | | |
|---|---|---|---|
| 3,370,827 A | * 2/1968 | Stehlin | 251/144 X |
| 3,403,885 A | * 10/1968 | Kretzschmann | 251/335.1 X |
| 3,417,960 A | * 12/1968 | Stehlin | 251/144 X |
| 3,804,365 A | * 4/1974 | Fetterolf et al. | 251/144 |
| 3,918,678 A | * 11/1975 | Rechtsteiner et al. | 251/144 |
| 3,949,963 A | 4/1976 | Aoki | |
| 4,141,535 A | * 2/1979 | Reedy et al. | 251/144 |
| 4,822,570 A | 4/1989 | Lerman et al. | |
| 4,836,236 A | 6/1989 | Ladisch | |
| 5,152,500 A | 10/1992 | Hoobyar et al. | |
| 5,277,401 A | 1/1994 | Butler et al. | |
| 5,296,197 A | 3/1994 | Newberg et al. | |
| 5,360,198 A | * 11/1994 | Amorese et al. | 251/144 |
| 5,525,301 A | 6/1996 | Newberg et al. | |
| 5,771,884 A | * 6/1998 | Yarnall et al. | 251/335.1 X |
| 5,786,209 A | 7/1998 | Newberg | |
| 6,133,022 A | 10/2000 | Newberg | |

* cited by examiner

Primary Examiner—Ehud Gartenberg
Assistant Examiner—Eric Keasel
(74) Attorney, Agent, or Firm—Birch, Stewart, Kolasch & Birch, LLP

(57) ABSTRACT

A valve for sampling a process from a tank or conduit includes an internal cavity in communication with at least one inlet and an outlet. A valve actuating rod includes a sealing tip attached to one end thereof. The valve actuating rod is movable to open and close the inlet to the internal cavity. Furthermore, a seal is provided to isolate the valve actuating rod and the outside environment from the process. The seal is formed on the process side of the bottom wall of the internal cavity in order to ensure that the process material, cleaning material, steam, etc. drains completely out of the internal cavity of the valve.

4 Claims, 10 Drawing Sheets

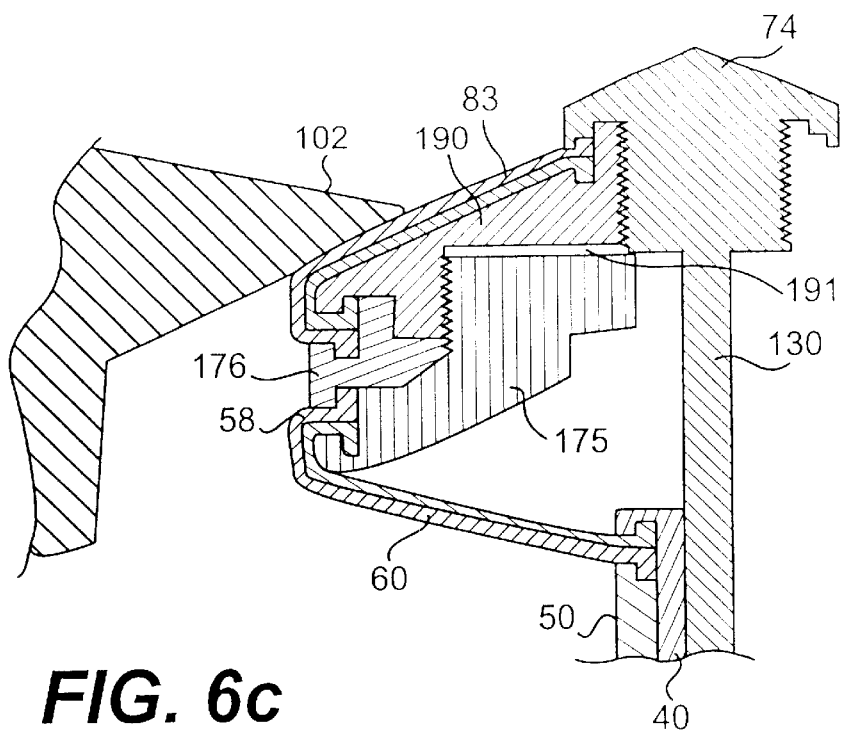
FIG. 6c
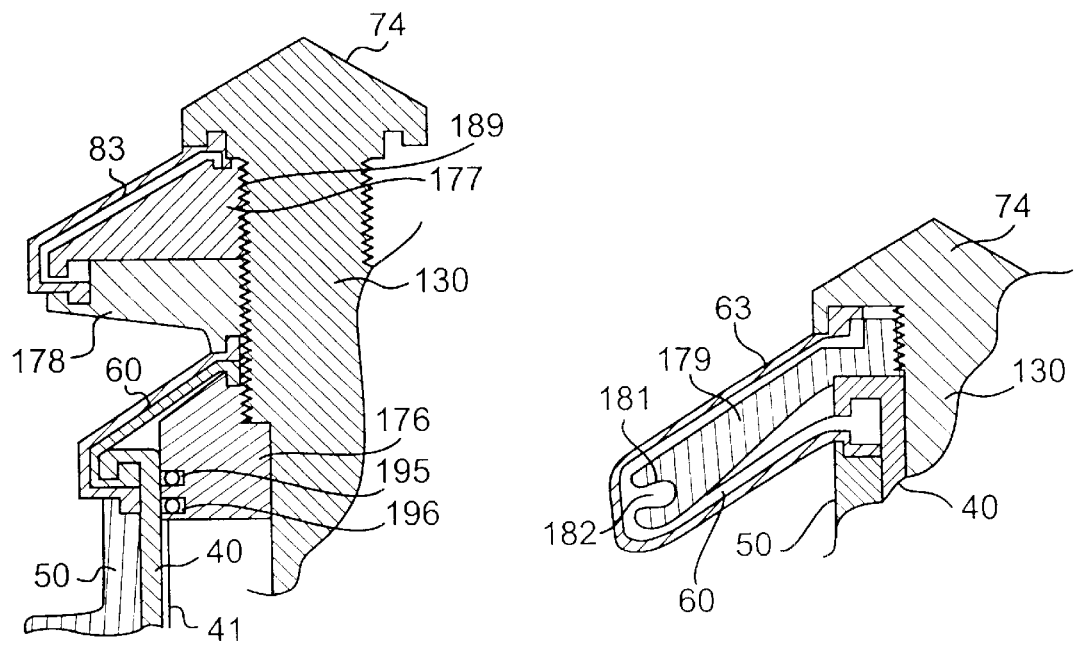
FIG. 6d
FIG. 6e

SANITARY DRAIN VALVE DESIGN

This application is a divisional of application Ser. No. 09/801,783, filed on Mar. 9, 2001, now U.S. Pat. No. 6,491,283 the entire contents of which are hereby incorporated by reference and for which priority is claimed under 35 U.S.C. §120; and this application claims priority of application Ser. No. 60/187,996 filed in U.S.A. on Mar. 9, 2000 under 35 U.S.C. §119.

BACKGROUND OF THE INVENTION

1. Field of the Invention

The present invention is directed to an improved sanitary valve design. In particular, the present invention is directed to a sanitary valve design that allows for free-drainage of process and sterilizing and cleaning materials.

2. Description of Background Art

There have been many incidents where sanitary processes have failed, resulting in loss of product. In some cases, harm to consumers occurs. In many instances the specific nature of the source of contamination remains unidentified. In many other instances; however, the source of contamination has been traced back to drain valves, which have not been properly cleaned, and in many cases where procedures specify it, sterilized between production runs.

Failures have not been limited to valve designs traditionally viewed as being problematic when used in sanitary applications (tulip and kettle valves, plug and ball valves, e.g.) but, rather, extend to include weir and radial diaphragm valve designs which are currently considered state-of-the-art designs particularly suited for sanitary processing applications.

The causes for these failures, almost without exception, relate to material accumulation in low, undrainable pooling areas and in tight crevice areas, particularly those associated with moving parts such as sliding or rotating O-ring seals. Deep, tight joints, particularly around moving parts, are primary sites for material to accumulate and are ideal safe havens for microbial proliferation. These sites can become tightly packed with highly nutricious process materials, which provide insulation and protection from cleaning and sterilizing agents, allowing significant microbial populations to develop over time. Deposits of tightly adhering organic and inorganic material resist the effects of caustic and acidic cleaning solutions, mechanical shear from agitation and high rates of circulation and from the effects of steam sterilization. Large deposits may develop in valves over time, a consequence of the selection of valves emphasizing design robustness and mechanical reliability over in-situ process cleanability and sterilizability. Cleaning and sterilizing followed by the initiation of process production may cause large deposits or accumulations to soften and slough or break off, getting blended into downstream process materials, representing significant contamination to the process. These large deposits are of particular concern because they represent contamination threats large enough to significantly affect product quality and process outcome even for processes traditionally considered very robust, such as some food, beverage and chemical production.

If gone undetected, product exposure can, in some cases, be harmful or even fatal. For this reason, regulators as well as the regulated industry have begun to look more closely at the source of the problem and search for ways to minimize it. An important part of this effort has been to implement more active preventative maintenance and inspection programs for valves. At some point, however, increasing human intervention becomes impractical and cost-prohibitive. Another part of the effort has been to re-examine the root cause of the problem. Specifically, the performance of current valve designs in sanitary process applications where valve maintenance efforts between production runs has been practically limited to in-situ cleaning, rinsing and steam sterilization.

As it turns out, process failures, although strongly skewed toward processes which have included valve designs which are dependent on sliding or rotating O-ring seals (i.e. ball valves, plug valves, tulip valves and kettle valves, have not been limited to these designs. Aoki, U.S. Pat. No. 3,949,963 and Lerman et. al., U.S. Pat. No. 4,822,570 disclose some typical examples of valve designs which may experience process failures. Even though many of the new sanitary processes being implemented include state-of-the-art weir diaphragm and radial diaphragm drain valve designs, failures still persist in these processes, albeit at a decreased rate. Typical examples of the above valve designs are Butler et. al., U.S. Pat. No. 5,277,401, Hoobyar, U.S. Pat. No. 5,152,500 and Ladisch, U.S. Pat. No. 4,836,236.

Diaphragm valves, with flexing diaphragms that allow valve actuation while isolating the process from moving valve parts and the surrounding outside environment, generally include less crevice areas and have smooth surfaces, all of which make them the best candidates available for use in CIP (clean-in-place) and SIP (steam sterilize-in-place) sanitary process applications. Of the other, more traditional valve designs, tulip and kettle valves are most frequently found in sanitary process applications. These valves are relatively inexpensive to install and maintain and are simple and mechanically reliable. Furthermore, even though they have more crevices as compared to diaphragm valves, it had been thought that their benefits were greater than their weaknesses and their weaknesses were not so serious as to restrict their use in processes requiring CIP and SIP steps before each batch, particularly in the more robust, food, beverage and chemical processing applications.

Inspection of valves commercially available today and of the background art reveal certain features common, not only to those drain valves making use of O-ring seals but also to both types of diaphragm drain valves. In particular, the seals formed between the valve body and the diaphragm or O-ring are made with the second, lower side of the bottom wall of the valve body internal cavity. As a result, the thickness of the bottom wall between the first (process) and second (non-process) sides form the wall of a well which is not possible to drain and serves to entrap and shelter process material, cleaning agents, rinse water and steam condensate. In some diaphragm designs, this well, though very large in diameter and, therefore, capable of harboring a large volume, relatively speaking, most areas can be washed clean except for the area immediately adjacent to the well wall. The problem associated with valves equipped with O-ring seals is, generally speaking, just the opposite. The wells above the seals tend to be very narrow because of the need for tight tolerances and a relatively close fit between the valve operating rod and O-ring/O-ring groove combination. Although the volume of the well tends to be much less, effective access for proper CIP and SIP procedure execution is not consistently possible.

Another problem area of valves associated with the design of bottom seal devices is their general tendency to have at least partially flat bottom walls to the valve internal cavity. While these walls may make these valves easier to fabricate, flat surfaces do not contribute to achieving positive drainage of materials from within the valve. Standing fluids, in many instances, can be as large of a threat of contamination as entrapped material, sometimes more because of the presence of large amounts of water, an important ingredient for microbial proliferation.

While the devices mentioned in this discussion may have certain weaknesses when used as drain valves or similar applications in sanitary processes, they may be perfectly adapted for other applications. It is the author's intent, however, to describe a valve design which includes several novel features which are flexible in concept and lend themselves to the improvement of more traditional drain valve designs. Among these are the elimination of the seal well in the bottom wall of the valve internal cavity which can be combined with the introduction of a bottom surface sloped toward the drain opening so that the bottom wall of the valve will actively urge process material, cleaning solutions, rinses and steam condensate to flow down and out of the valve. Other features include the option of rearranging secondary inlets and the drain outlet so as to encourage a swirling, scouring action of materials flowing through the valve so that more effective CIP and SIP results can be achieved. The new design will be illustrated in both diaphragm and O-ring type seal designs.

SUMMARY OF THE INVENTION

An object of the present invention is to provide an improved general valve design having good characteristics of process isolation and in-situ cleanability in many orientations as well as providing specific improvements in cleanability and drainability performance capabilities over the background art when used in conduit or tank bottom valve applications.

Another benefit of the present invention is an improved, free-draining, cleaner sealing arrangement for tulip, kettle and other O-ring-based seal designs, it also being possible to clean and sterilize the sealing arrangement from the back, non-process side independently from the process side on a descript or continuous basis, even while the valve is being operated.

A further object of the present invention is to provide a valve that can be mounted directly on the bottom of a tank, and, in the diaphragm configuration, can provide absolute isolation of the process from the valve components and the outside surrounding environment. Furthermore, in the case of o-ring designs, the present invention can provide a high degree of isolation of the process from the valve components and the outside surrounding environment.

A benefit of the device of the present invention is that it provides a smooth, crevice free flow path, which will permit very highly effective drainage of process material from a tank or conduit.

Another object of the present invention is to provide a design that can be flush-mounted, thereby eliminating the formation of dead zones at the inlet into the valve.

Yet another object of the present invention is to provide a valve design where process material, cleaning solutions, rinse water and steam condensate drains down and away from the seal formed between the valve body and the sealing body (diaphragm or O-ring), eliminating the undrainable well or sump area that occurs in the prior art where material collects and is difficult to remove.

Another object of the present invention is to provide an internal valve body design with a second inlet positioned in the same plane or above the outlet and directed so that flow from the second inlet flows into, around and out of the internal cavity of the valve in a circular or spiral path so as to provide improved CIP and SIP performance.

Still another object of the present invention is to provide a design that can be actuated manually or automatically and which can be opened partially or fully, thereby allowing the valve to be used to regulate flow.

A further benefit of the valve design concept of the present invention is that it can be employed in many design forms all of which may provide diaphragm isolation in combination with drainable seals and internal valve cavities.

Yet another object of the present invention is a valve body design that can be fabricated as a single piece Still another benefit of the present invention is that the same valve body may be used in many different installation configurations, because the connection flange may be constructed as a separate piece from the valve body, allowing it to be changed to fit a clamp or bolt pattern already installed on the vessel or conduit.

An additional benefit of the present invention is that the diaphragm arrangement valve may be constructed of many types of material so as to impart flexibility of manufacture and use in a variety of different material processes.

A further benefit of the valve design concept of the present invention is that it illustrates how the diaphragm may include single or multiple sections, and guidance on how those may be incorporated into sealing arrangements in the valve in order to provide a greater range of motion for the sealing tip of the valve even when the diaphragm membrane may exhibit greater or lesser degrees of rigidity, flexibility or elasticity.

Another benefit of the valve of the present invention is that it may be rotated 360 degrees so as to provide greater installation versatility.

Yet another purpose of the present invention is to provide a simple, economic design that may easily be disassembled for maintenance purposes.

Another object of the present invention is to provide a design that can be used to great effect over other prior designs in installations and applications other than tank or conduit drain applications and where superior clean-in-place and sterilize-in-place as well as drainability characteristics will be demonstrated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(a)–6(e) are central cross-sections of examples of other diaphragm sealing arrangements;

DESCRIPTION OF THE PREFERRED EMBODIMENTS

In general, the device of the present invention includes a valve body equipped with a manual, automated or combination actuator capable of moving a sealing tip attached to a valve operating rod reversibly into a sealing condition with a valve seat surrounding a first inlet flow passage into an internal cavity in the valve body. The valve body has at least one outlet flow passage placed at the bottom of the internal valve body cavity to receive drainage, the bottom preferably but not necessarily being cantilevered or otherwise formed so as to assist drainage down to at least one outlet flow passage. A seal is formed between the static valve body and the dynamic valve actuating rod in which, whether an O-ring seal or diaphragm seal is used, the interface between the sealing elements is carried out in a face-down configuration so as to create a self-draining sealing interface and to eliminate the pooling that is associated with sump or well areas that occur in the annular space above the face-up seals found in the background art. One preferred arrangement of the device includes a second inlet which is placed near the top of the internal cavity, near the first inlet but spaced radially from it, a bottom outlet placed at the bottom of the internal cavity, the opening of the second inlet and the opening of the outlet being diametrically opposed with regard to flow in such a way that flowable material fed through the second inlet will spiral down and around, sweeping and scouring the sides of the internal cavity before flowing directly into the facing bottom outlet. The device will be described in detail below in some of the various configurations it may be designed into once the main concept of the present invention is understood.

A valve design arrangement will be described which includes a one-piece flexing diaphragm with a sealing tip which, when actuated by a valve operating rod, cause the sealing tip of the diaphragm to form a reversible process seal with the valve body so as to permit control of process flow through the valve all while maintaining the integrity of the process separate from that of the valve and the surrounding outside environment.

Figure 1:
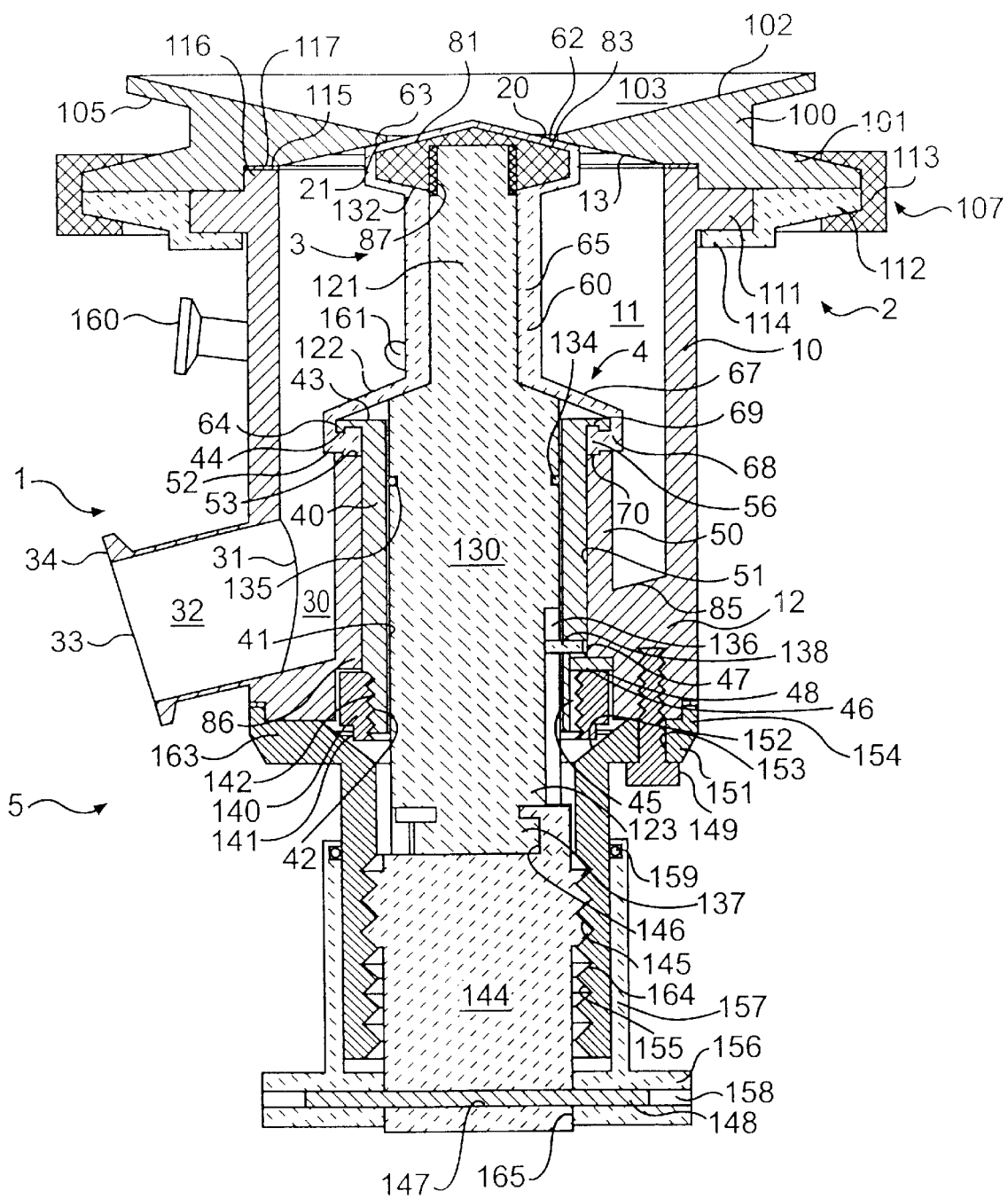
FIG. 1 is a cross-section of a 1-piece "Mushroom" diaphragm valve in closed position, with a second inlet feeding to the internal cavity through the valve body side wall, above the drain opening.

FIG. 1 is a center cross-sectional view of one preferred embodiment of the device of the present invention, shown in position as a bottom drain valve. As shown, valve assembly 1 includes a valve body subassembly 2, diaphragm subassembly 3, valve actuator rod subassembly 4 and actuator device 5, which, in this case, is a manual actuator. It should be noted that all of the internal passages of the valve which are in contact with the process material should be rounded in order to avoid any sharp corners where the process material, cleaning materials, steam, etc. may accumulate. Several of the Figures in the present application illustrate sharp corners, although it is preferable that curved corners be included.

The valve body subassembly 2 will now be described. The valve body subassembly 2 includes a valve body 10 and a cover plate 100 which are connected together by an attachment device 107. Valve body 10 has an internal cavity 11 with a bottom wall 12 having an upper first side 85 and a lower second side 86, upper first side 85 being exposed to the process, lower second side 86 being removed from the process. Internal cavity 11 or valve body 10 is in communication with at least one drain outlet 30 and at least one first inlet 20. The drain outlet 30 is in communication with a drain passage opening 31.

The upper surface 102 of cover plate 100 forms a portion of a wall or drain basin 103 of a tank or conduit (not shown). The lower surface of cover plate 100 forms a roof 13 of the internal cavity 11.

In the example shown, first inlet 20 is centered at the bottom of drain basin 103 having a bottom formed by the upper surface 102 of the cover plate 100. A second side of the cover plate 100 forms an uppermost side or roof 13 of internal cavity 11. The annular surface of roof 13 immediately adjacent the first inlet 20 forms an inlet annular sealing surface 21 with which a seal is reversibly formed when mated with an annular diaphragm sealing tip surface 63 on an actuating cap or sealing tip 83.

It should be noted that FIG. 1 illustrates roof 13 with a conical profile that tapers up to the first inlet 20. Although not a necessity, the taper can improve flow through the valve and serve as a guide to center the annular diaphragm sealing tip surface 63 onto the mating inlet annular sealing surface 21.

By way of example, cover plate 100 is illustrated with upper flanges 105 welded into a wall of a conduit or vessel (not shown). However, cover plate 100 may take many other forms such as, for instance, a sanitary ferrule with an internal diameter the same as the diameter of the first inlet 20 and to which the valve assembly could be attached.

Figure 2:
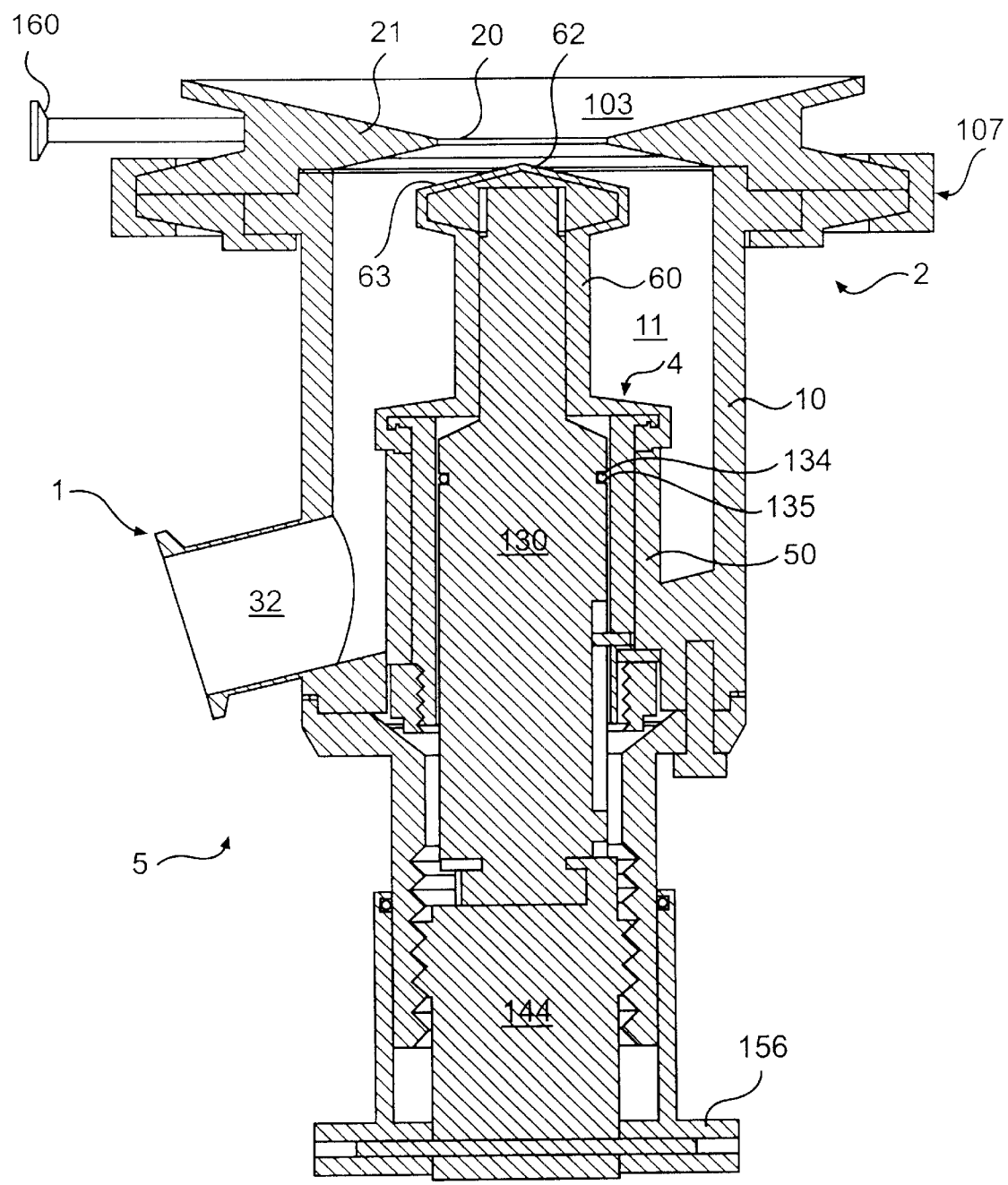
FIG. 2 is a cross-section of a 1-piece "Mushroom" diaphragm valve in an opened position, with a second inlet feeding into the internal cavity through the cover plate from a radial position.
Figure 3:
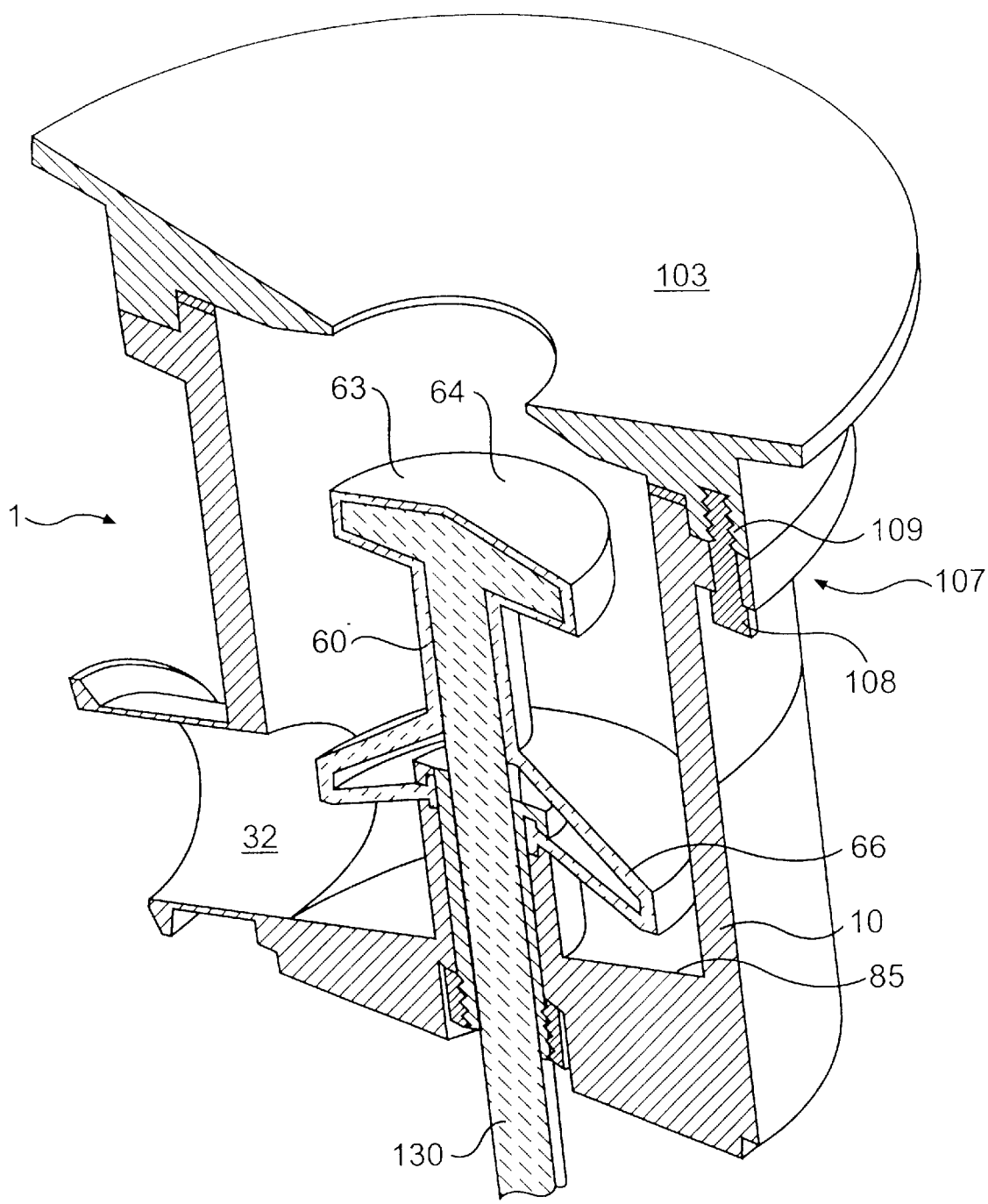
FIG. 3 is a perspective view in cross-section of one alternative diaphragm design offering a greater range of motion through the incorporation of a bellows.
Figure 4:
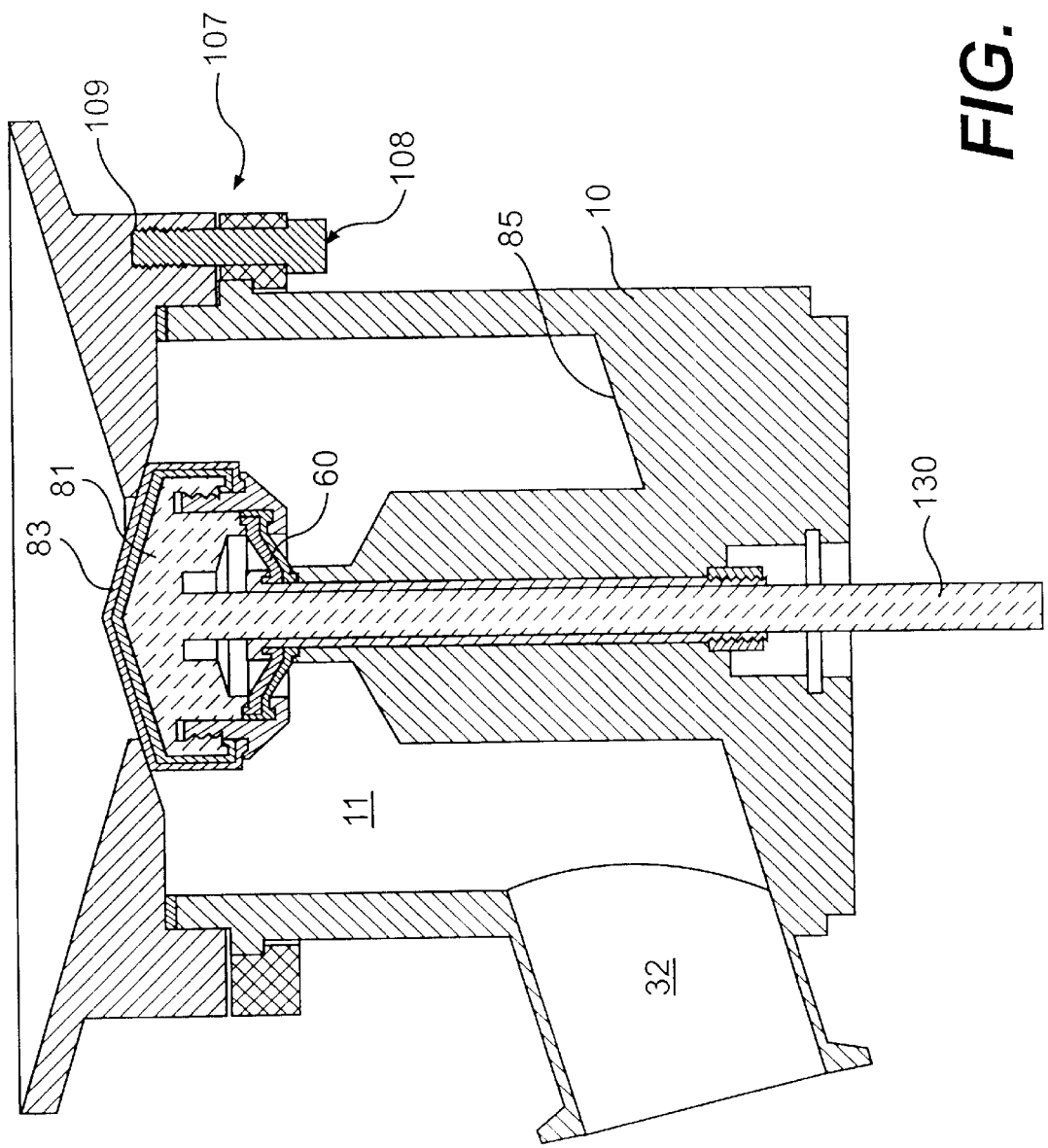
FIG. 4 is a cross-section of a 2-piece "Mushroom" diaphragm valve.

In addition, cover plate 100 can be attached to the valve body 10 by an attachment device 107 such as a bolt 108 and threads 109 as shown in FIGS. 3 and 4 or, as shown in FIGS. 1 and 2, mating flanged elements. Clamp 113 clamps cover plate flange 101, located above and valve mounting flange 112, located below, together about swivel shoulder 111. Swivel shoulder 111 engages with mounting flange shoulder 114. While swivel shoulder 111 would not be necessary in order to be able to swivel the valve to any position over 360 degrees if the attachment device is two flanges clamped together as shown in FIG. 1, if, however, the attachment device 107 includes a bolt pattern, the assembly would only be able to be rotated to certain positions. A significant benefit of having valve mounting flange 112 as a distinct piece from valve body 10 as shown in FIG. 1 is that it will allow one standard body of the valve to be mated with a variety of preexisting bolt and clamp patterns.

When the attachment device 107 is tightened, the upper margin 116 of the valve body 10 is moved into contact with the bottom of gasket 115 while the annular recess 117 of cover plate 100 is moved into contact with the top of gasket 115, creating a seal between the cover plate 100 and the valve body 10. For diaphragm change-out and other maintenance procedures, valve body 10 and the attached actuator device 5 may be quickly and easily disconnected from cover plate 100 by removing the attachment device 107.

Valve body 10 may have a second inlet 160 entering into internal cavity 11 through a second inlet opening 161 in the side wall of valve body 10 as shown in FIG. 1. This additional inlet generally would be used to supply cleaning solutions, rinse water and steam to clean the valve in-situ between uses. Placing the second inlet in a side wall of valve body 10 as shown in FIG. 1 may be simpler to do than in many other places on the valve, but the most effective location is likely to be near the top of the internal cavity 11, radially from the diaphragm and offset to one side, preferably in an orientation that would direct inlet flow in a downward spiral pattern with the flow being oriented so as to flow directly into the drain passage opening 31. FIG. 2 illustrates an example of effective positioning of the second inlet 160. Drain passage opening 31 is shown centrally placed at the bottom of internal cavity 11. Drain passage opening 31 might be most effective if it was shifted to the side so as to capture more fully the second inlet flow.

Drain outlet 30, which is in communication with drain passage opening 31 opens into drain passage 32, which, in turn, leads to drain passage exit 33. Drain passage exit 33 includes a drain connection device 34 for forming a connection to downstream piping so as to convey the material drained through the valve assembly away. By way of example, drain connection device 34 is shown here as a sanitary clamp connection but could be any suitable form of connection capable of conveying drained material. In the preferred embodiment shown, bottom wall 12 is shown declining to drain passage opening 31. Although not a necessity, this arrangement would generally be considered a desirable one since the slope of bottom wall 12 and its smooth, uninterrupted transition across drain passage opening 31 into drain passage 32 combined with the declining orientation of the drain passage 32 would passively urge material from within the valve, thereby acting to keep it clean and free of potential contaminants. This feature is generally lacking in the background art and in equipment available today, the details of which will be discussed below.

A primary source of problems occurring in valves used as drain valves in sanitary applications relates to the seal arrangement made between the valve body and the valve operating rod. With valve designs in use today, a seal is formed between a second side of the bottom wall of the internal cavity with a sealing element, be it an O-ring or diaphragm. Because this seal is formed behind the second side of the bottom wall, the position of this portion is at the lowest point in the internal cavity, below even the opening to the drain outlet. As a consequence, drain valves being used today all tend to collect material in the basin formed about the seal. The thickness of the bottom wall, between the first, process side and the second, non-process side, dictates how readily material can be flushed out of the pooling area about the seal. Even in the best of situations this is still a concern to operators.

It is the purpose of the present invention to provide a new sealing device that will eliminate the well or crevice area found at the bottom of valves, thus removing a significant risk factor for process contamination.

In the place of the bore with a seal face on the second side of the bottom wall 12 of valve body 10 for mating with either an O-ring or diaphragm found in other valves, the present invention includes a central raised tubular structure or pedestal 50. Shoulder 43 of diaphragm clamp sleeve 40 is inserted up into diaphragm shoulder recess 64. A lower portion of diaphragm clamp sleeve 40 is inserted into pedestal central bore 51. Furthermore, the diaphragm clamp sleeve 40 includes a central bore 41 through which a valve operating rod 130 passes. As diaphragm clamp sleeve 40 is pulled further down into pedestal central bore 51, shoulder 43 pulls a bottom, process-side surface or shoulder 68 of diaphragm 60 down and into contact with top annular surface 53 of pedestal 50. As the threads 142 of retainer nut 140 are further tightened onto clamp threads 42 of diaphragm clamp sleeve 40, the upper face of retainer nut 140 is brought into contact with a second side 86 of bottom wall 12, causing diaphragm clamp sleeve 40 to be pulled further down into pedestal central bore 51 and causing shoulder 43 to compress the shoulder 68 of diaphragm 60 against top annular surface 53 of pedestal 50, forming inverted seal 56 with it. Inverted seal 56 and other seals like it that will be discussed below are all exposed seals that are easy to clean in-situ and are passively self-draining seals that tend to shed process material rather than collect them. The retainer nut 140 includes retainer nut flats 141 for engaging with a wrench to tighten the retainer nut 140. FIG. 1 depicts upper lip 69 and lower lip 70 on shoulder 68 interlocking with lip 44 on shoulder 43 and raised outer annular lip 52 on top annular surface 53, respectively. These interlocking structures add to the stability of the seals formed but may not be necessary, depending on the physical and chemical process conditions that will be encountered. Also, while the mating surfaces of shoulder 68 of diaphragm 60, of top annular surface 53 of pedestal 50 and shoulder 43 of diaphragm clamp sleeve are all shown as being generally horizontal, this need not be the case. While arrangements that are horizontal or angled so as to promote drainage to the outside diameter of the pedestal are preferred, arrangements having an angle down and toward the inside of pedestal 50 can also provide good results.

Diaphragm 60 may be formed as a one-piece unit with a threaded tip insert 81 as shown in FIG. 1. Diaphragm 60 also includes a flexing upper base shoulder 67, neck 65, and sealing tip 62. The threads 132 on the tip of valve operating rod 130 may be threaded up into threads 87 in insert 81. In order to assure that valve operating rod 130 does not unscrew from insert 81 during operation, when valve operating rod 130 is inserted through diaphragm clamp sleeve 40, a pin 138 may be inserted partway through a hole 47 in the wall of diaphragm clamp sleeve 40 so that it extends into a longitudinal keyway 136 in the side of valve actuating rod 130. Likewise, to keep diaphragm clamp sleeve 40 from rotating, a longitudinal keyway 45 is fitted with a pin 46 which extends out into a recess notch 48 cut into the second side 86 of bottom wall 12. Pin 46 is fixed in notch 48 by pressure from below by the upper face of retainer nut 140.

Valve operating rod 130 includes a long neck 121 that fits inside diaphragm neck 65. At the base of long neck 121 is a diaphragm support shoulder 122 that mates with flexing upper base shoulder 67 of diaphragm 60, providing it with support. Just below the diaphragm support shoulder 122 is an O-ring 134 and groove 135 that seals between valve operating rod 130 and the central bore 41 of diaphragm clamp sleeve 40. The lower body 123 of valve operating rod 130 terminates in T-cap 137. T-cap 137 fits into a T-slot 146 formed in handwheel 144, which is equipped with threads 145 which mate with opposing bonnet threads 155 formed in bonnet 163. The lower portion of handwheel 144 fits into a central bore 165 in handgrip 156 where it is pinned with a lock-pin 148 inserted in a bore 158 extending laterally through the side of handgrip 156 and into a similar bore 147 in handwheel 144.

Handgrip 156 has a handle sleeve 157 that fits around the outside of bonnet neck 164 and seals against it with an O-ring and groove combination 159. In FIG. 1, bonnet 163 has a base plate 151 with alignment lip 154 and bonnet recess 152 and is shown affixed to valve body 10 by bolts 149 inserted in bolt holes 153 formed in base plate 151 and threaded into valve body 10. This method of attachment is simply one example of many different ways that could be used to attach the bonnet 163 to the valve body 10.

When handgrip 156 is rotated, handwheel 144 is threaded up or down in bonnet 163, pushing and pulling valve operating rod 130 and the attached sealing tip 62, causing sealing tip 62 of diaphragm 60 to reversibly seal and unseal the valve.

FIG. 2 depicts the valve in an opened condition. FIG. 2 also shows an alternative position of the second inlet 160 which offers benefits with regard to improved cleaning, rinsing and sterilizing over the position depicted in FIG. 1. The remaining elements in FIG. 2 are the same as those in FIG. 1 and have therefore not been further described.

FIG. 3 depicts one alternative diaphragm design offering a greater range of motion through the incorporation of a bellows 66 as an integral part of the diaphragm 60, the embodiment of FIG. 3 fails to include the second inlet 160 of FIGS. 1 and 2; however, it should be understood that a second inlet 160 may be included, depending on the application. The remaining elements in FIG. 3 are substantially the same as those in FIGS. 1 and 2 and therefore have not been further described.

FIG. 4 depicts another arrangement of the inverted seal design of the present invention in which the diaphragm 60 is annular or frusto-conical and double-layered. The arrangement shows inner and outer diameter sealing arrangements in addition to depicting one method by which a 2-layer sealing cap 83 may also be secured over an insert 81. FIG. 4 also illustrates another attachment device 107 for connecting valve body 10 to cover plate 100, as described previously, wherein a bolt 108 and threads 109 are used to secure the elements together.

Figure 5:
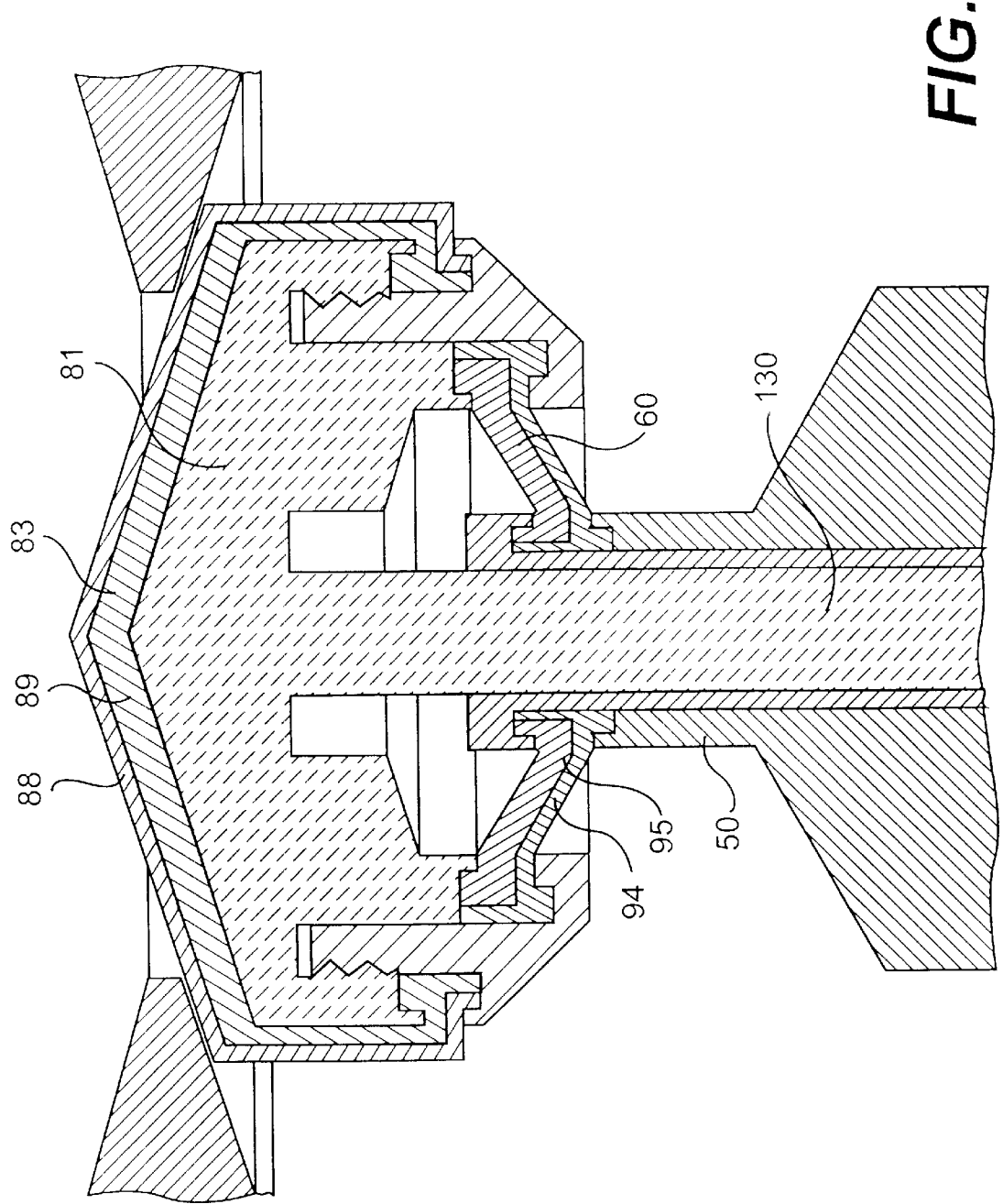
FIG. 5 is a close-up cross-section of the 2-layer diaphragm sealing device mounted in the cap.

FIG. 5 is a close-up of the sealing device of the valve 1 shown in FIG. 4. As can be clearly understood, the sealing cap 83 includes two layers. A first, outer layer 88 and a second, inner layer 89. Furthermore, the diaphragm 60 includes two layers 94 and 95.

Diaphragms used in the food, beverage and pharmaceutical industries are usually made of Buna-N (Butadiene/acrylotonil), EPDM (Ethylene/propylene/diene), Viton (Flurocarbon), Silicon (Medical grade silicon) or TEFLON (PTFE or Polytetraflouroethylene)

PTFE is frequently used where diaphragm purity or inertness are desired, like with many products that might be injected. The problem with PTFE is that it is fairly still, more like plastic than rubber and tends to cold flow, meaning that you might tighten it down snugly today but, over time and under pressure, it will buldge out to the sides and become loose again. That is why it is pretty common to put some type of layer of rubber (elastomeric) backing material behind it. That way the rubber material continues to press the Teflon into the mating sealing surface even after it has begun cold-flowing under pressure. Actually, a seal made with PTFE without backing may stay water tight for a week or a month but with rubber backing it might continue to hold for years.

It should be noted that the embodiments of the present invention illustrated in FIGS. 1–3 may also include two layer diaphragms and the embodiment of FIGS. 4 and 5 may be made with one layer of material for the sealing cap 83 and the diaphragm 60, depending upon the particular application of the valve 1.

Figure 6A:
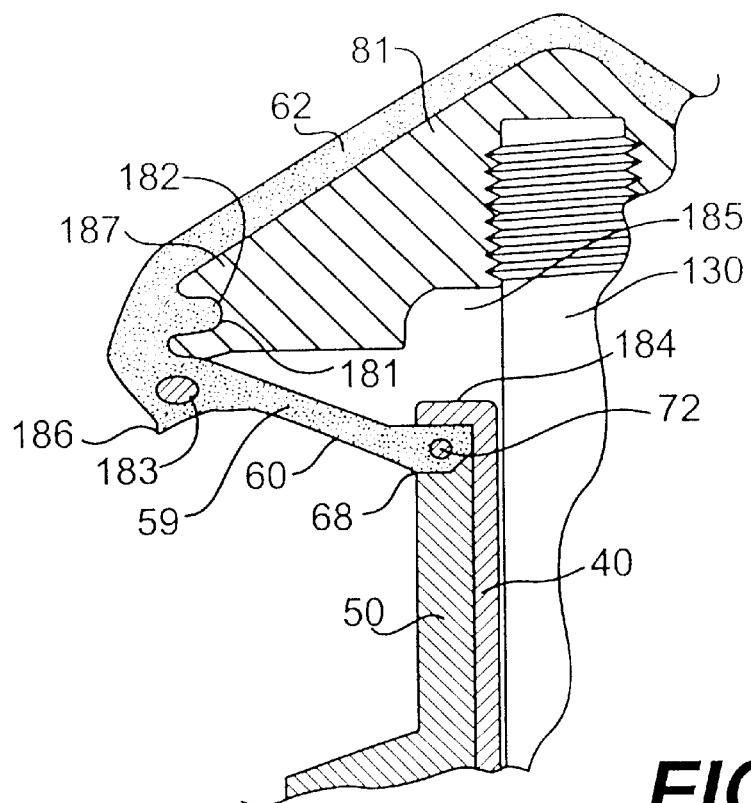
Figure 6B:
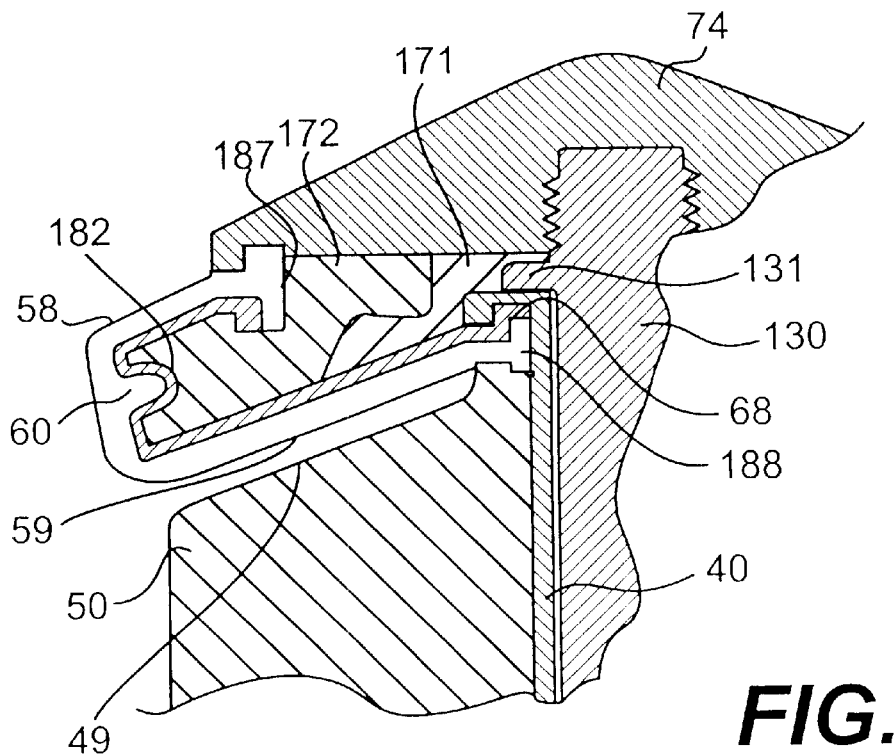

By way of example, FIGS. 6(*a*) to 6(*e*) depict several other methods by which inverted sealing arrangements can be made.

FIG. 6(*a*) illustrates another manner in which the concept of the inverted seal can be applied. The valve in this figure is similar to that in FIG. 1. The embodiment of FIG. 6(*a*) differs in that the diaphragm 60 does not include the neck 65 and shoulder 67 as shown in FIG. 1 but, instead, includes only a shoulder 68 with the sealing tip 62, supported from underneath by the shoulder 187 of the insert 81, forming a reversible seal with the annular sealing surface 21 about the first inlet 20 (see FIG. 1).

A further difference is that the shoulder 68 extends much further inward, toward the central axis of the valve actuating rod 130 where it forms a seal with the pedestal 50. As a consequence, the pedestal 50 and diaphragm clamp sleeve 40 necessary to form the static seal between the bottom process side of the diaphragm 60 and the top process side of the pedestal 50, would probably be narrower than shown in FIG. 1 for the same size valve. This is because the flexing portion 59 of the diaphragm 60 is now formed in the shoulder 68, rather than in the shoulder 67 as in FIG. 1. Also, if the valve were generally of the same dimensions as the one shown in FIG. 1, the pedestal 50 and the diaphragm clamp sleeve 40 would need to be longer in order that a newly positioned sealing surface 63 of the diaphragm 60 may be brought into contact with the sealing surface 21 about the first inlet 20. Another difference illustrated in FIG. 6(*a*) would be the elimination of the shoulder 122 between the lower body and the neck 121 of the valve operating rod 130. This structure, designed to support the flexing upper shoulder 67 of the diaphragm 60 from underneath, could be included as a shoulder 49 built into the pedestal 50, similar to that seen in FIG. 4.

FIG. 6(*a*) also depicts other differences from FIG. 1. The shoulder 187 of the insert 81 includes an undercut 181 where the diaphragm 60 thickness is made greater. This thickness or rib 182 serves to stabilize the diaphragm 60 and dampening the motion occurring along the shoulder 68, inhibiting its transfer through the diaphragm 60 up to the sealing surface 63 of the diaphragm 60 where it reversibly seals with sealing surface 21 about the first inlet 20. A further stabilizing diaphragm inclusion is the first ring 183 positioned in the diaphragm 60 near the outer rim of the insert 81. Besides serving to dampen the transfer of motion caused by the flexing of the shoulder 68, both the rib 182 and the first ring 183 tend to keep the diaphragm 60 from shifting in position relative to the insert 81.

FIG. 6(*a*) also includes a second ring 184 positioned within the diaphragm 60 about the center hole 72 of the diaphragm 60 and adjacent to where the process side of the diaphragm 60 forms a static seal with the first, upper, process side of the bottom wall 12 of the internal cavity 11. In all of the other depictions of diaphragms provided in the present disclosure, the diaphragm 60 has no inclusions and, in order to stabilize the diaphragm 60 where it is desirable to form static seals with valve elements, lips have 69 and 70 have been shown constructed in the diaphragm 60 which interlock with opposing lips 44 and 52 in the mating valve elements. It is usually more expensive to include interlocking combinations. Accordingly, where possible and acceptable, it would be desirable to eliminate these lips, both in the structure of the diaphragm 60 and in the valve elements. An alternative approach which may sometimes be acceptable and, in some instances preferable, an internal stabilizing element may be used, here, shown as rings 183 and 184. Other approaches include perforated washer insertions, cloth or wire mesh and many more items. If properly stabilized, the lips on both the diaphragm clamp sleeve 40 and the pedestal 50 could be eliminated, as shown in FIG. 6(*a*) in any of the embodiments of the present disclosure.

Sometimes these inclusions present manufacturing and assembly challenges. In this case, the diaphragm 60 could be molded around the threaded insert 81 with the diaphragm clamp sleeve 40 nested up into the annular cutout 185 shown. The rings 183 and 184 could be stabilized during the molding process from the insert 81 and the diaphragm clamp sleeve 40.

Lastly, the outer margin of the shoulder 68 of the diaphragm in FIG. 6(*a*) comes to a relatively sharp edge, a structure not seen in other drawings herein. This is a drip lip 186, designed to encourage materials running down the upper surface of the sealing tip 62 to drip off rather than cling to the underside of the diaphragm 60 and flow down over the seal and down the side of the pedestal 50.

FIG. 6(*b*) is the same as FIG. 6(*a*) with regard to peripheral structures of the valve (not shown). FIG. 6(*b*) is also similar to 6(*a*) in that the flexing of the diaphragm 60 takes place on the shoulder 68 as illustrated by the flexing portion 59. In FIG. 6(*b*) is shown retaining interlocking lip structures 187 and 188 formed in each of the two layers of the diaphragm 60 as well as in the mating valve elements shown. FIG. 6(*b*) includes a double-layered diaphragm 60 as do FIGS. 4, 5, 6(*c*), 6(*d*) and 6(*e*). FIG. 6(*b*) also depicts a pedestal shoulder 49 (described in the discussion about FIG. 6(*a*) above) which is positioned in much closer proximity to the shoulder 68 of the diaphragm 60, more clearly illustrating how it would provide support from below when the sealing assembly is retracted, as it is shown here; FIG. 6(*a*) shows the assembly extended. Another difference between the assemblies shown in FIGS. 6(*a*) and 6(*b*) is that the diaphragm 60 in FIG. (6*a*) is closed above while the one in FIG. 6(*b*) is shown open. The purpose for showing this difference is to illustrate, again, that the diaphragm 60 may be made in a number of ways such as opened above but forming a seal with a cover attached to the valve operating rod or closed above and secured to an insert 81 which, in turn, can be affixed to the valve operating rod, so that, in both cases, the valve operating rod can move the assembly, reversibly bringing the sealing tip 62 in contact with the annular sealing surface 21 about the first inlet 20 to open and close the valve. FIGS. 1–5, 6(*c*), 6(*d*), 6(*e*) and 7 all depict some of the many different arrangements that may be made, all of which include a static seal being formed between a first, process side of the bottom wall 12 or a raised surface of the bottom wall 12 of the internal cavity 11 and a first, process side of the diaphragm 60.

Continuing, the diaphragm 60 in FIG. 6(*b*) has a short upper shoulder 58 supported from beneath by a two-piece insert, the inner piece 171 of which rests against a lip or step 131 formed in the valve operating rod 130. The short upper shoulder 58 forms the sealing surface 63 that mates with the sealing surface 21 about the first inlet 20. The shape of the nested two-piece insert is designed so as to facilitate assembly of a semi-ridged diaphragm 60 onto a supporting insert structure. The outer nesting insert 172 which fits into the diaphragm recess can be sectioned vertically into pie sections to facilitate assembly. When the threaded cap 74 is tightened down onto the valve operating rod 130 after the two-piece nesting insert is in place, the assembly will tend to self-align while, at the same time, forming an upper process side seal with the short upper shoulder 58 of the diaphragm 60. The sloping in the short upper shoulder 68 assures it will drain down and away from the sealing interface with the lip of the threaded cap 74. The seal formed on the underside of the diaphragm 60 with the pedestal 50 is the same as in FIG. 6(*a*). The diaphragm 60 in 6(*b*) also includes the rib 182 to dampen transfer of the flexing motion of the shoulder 68 of the diaphragm 60 as the valve is actuated as in FIG. 6(*a*).

FIG. 6(*c*) combines the short upper shoulder 58 and long lower shoulder 68 seen in FIG. 6(*b*) but without the added rib 182 of FIG. 6(*b*). Instead, a separate sealing cap 83 is included, similar to that seen in FIG. 4 and 5, but opened at the top as illustrated in FIG. 6(*b*). By placing threads 189 along the inside diameter of the uppermost insert 190, a cap 74 can be formed in the end of the valve operating rod 130. With the diaphragm cover in place on the uppermost insert 190, it can be threaded up on the valve operating rod 130 threads until a tight seal is formed at the top. As in the case of FIG. 6(*b*) and elsewhere, a draining seal is achieved. The outer edge of the lower threaded insert 175 is inserted into the recess 191 under the short upper shoulder 58 of the lower flexing diaphragm 60 and a spacer 176 with opposing sealing surfaces designed to mate with the bottom sealing surface of the sealing cap 83 and the top sealing surface of the bottom flexing diaphragm 60 is place in position therebetween and the lower threaded insert 175 is threaded up into the uppermost insert 190. Tightening the lower threaded insert 175 into the uppermost insert 190 compresses the elements and forms tight seals about the lower shoulder of the sealing cap 83 and the upper shoulder of the lower diaphragm 60. The last seal, formed between the flexing diaphragm and the pedestal 50 and diaphragm clamp sleeve 40 is formed in the same fashion and elements as in FIG. 6(*b*).

One of the benefits of the embodiment of FIG. 6(*c*) is that the diaphragms and sealing caps used can be designed so they are relatively flat and open, making them easier and less expensive to make. Furthermore, this figure and FIG. 6(*d*), besides showing some of the many arrangements possible, demonstrates that the same diaphragm can be used to make many different arrangement and configurations. All four of the diaphragm and sealing cap pieces depicted in FIGS. 6(*c*) and 6(*d*) are identical. One practical benefit of such design arrangement is that only one type of replacement part needs to be stocked.

As mentioned above, the diaphragm and sealing cap elements pictured in FIG. 6(*d*) are identical to each other as well as to each of the ones pictured in FIG. 6(*c*). In order to form the seals for the sealing cap 83, a set of inserts 177 and 178 with mating sealing faces and with threaded inside diameters are introduced. These may be threaded up onto the threads on the outside of the valve operating rod 130 and made to securely engage and form seals with the sealing faces of the sealing cap. The upper seal of the lower diaphragm 60 is formed with the bottom of the second insert 178 and the top of a third insert 176, also threaded up on the valve operating rod 130 on its inside diameter threads. The lower seal of the diaphragm 60, the diaphragm which will be perform the flexing in this case, is formed with the same structural elements and in the same manner as was the seal in FIG. 1. The third insert 176 provides the same supporting shoulder function as did the shoulder 122 formed as a part of the valve operating rod 130 in FIG. 1. Lastly, this third insert 176 is depicted with two sets of o-ring seals 195 and 196 to seal against the inside diameter 41 of the diaphragm clamp sleeve 40 while the counterpart sealing arrangement depicted in FIG. 1 only showed one o-ring seal. It should be understood that one could, in all instances that appear in the present disclosure, include more than one o-ring-o-ring groove sealing combination if it were deemed desirable to do so.

All of the structures in FIG. 6(*e*) can be found within FIG. 6(*c*). Essentially, FIG. 6(*e*) combines both the upper and lower double-layer diaphragm elements into one diaphragm element. This element is open above and below, having seal-forming surfaces with lips located annularly about each opening. As in FIG. 6(*c*), once the insert 179 is placed within the recess of the diaphragm, it can be threaded up onto the threads near the tip of the valve operating rod. As the insert 179 is tightened onto these threads, the center upper annular seal surface with its lip are brought into tight contact with the opposing interlocking sealing surface and lip combination formed on the lower side of the valve operating rod 130 tip. Because the seal is formed with all the elements having externally declining surfaces, this sealing arrangement, used here and depicted in other figures, such as in FIGS. 6(*c*) and 6(*d*), drains and does not collect material. This sealing arrangement is the same as in 6(*b*) but it is depicted formed out further on the upper shoulder and, instead of the insert being threaded up on the valve operating rod 130, the tip is a separate piece with threads and is tightened down from above on the valve operating rod 130. The manner in which the lower shoulder seal is formed with the pedestal 50 and the diaphragm clamp sleeve 40 in 6(*e*) is the same as in all of the other configurations pictured here. FIG. 6(*e*) also depicts a diaphragm 60 with a rib 182 formed in a recess 181 in the insert 179. What makes this diaphragm arrangement special is its compactness and the fact that it would lend itself to manufacturing with the insert 179 in place, particularly if the application allowed the diaphragm to be manufactured without the lips which are needed sometimes to help assure the stability of the seal.

Figure 7:
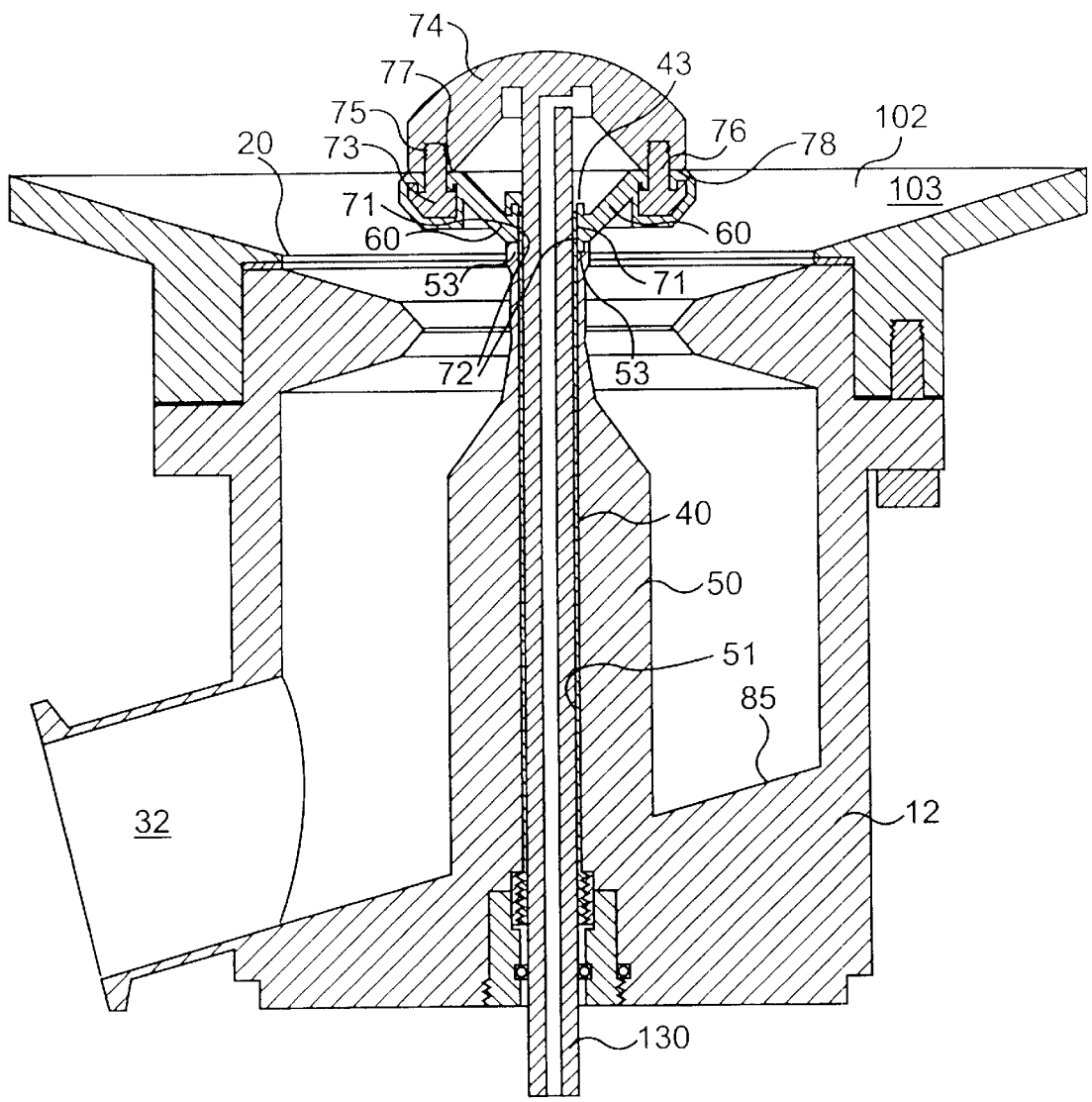
FIG. 7 is a cross-section of an example of inverted sealing technology applied using a diaphragm in a tulip valve configuration.

FIG. 7 illustrates a diaphragm tulip valve. Tulip or kettle valves available today still include a dynamic O-ring seal placed at the bottom of the internal valve cavity, behind a first surface of the bottom wall of that cavity as they have for years. This design approach, although simple, mechanically dependable and inexpensive to manufacture, results in the formation of a collection well or sump just above the dynamic O-ring seal formed with the valve operating rod or stem, and is a site where material collects and adheres and, later, between process batches, becomes very difficult to remove in-situ without manual intervention. Concerns about batch-to-batch contamination are further enhanced with design by the fact that material can be carried down past the O-ring seal where it will be sheltered from cleaning and sterilizing procedures only to be reintroduced some time later, resulting in contamination of that batch. In spite of these problems, tulip or kettle valves are still used quite widely today in processes that are robust and resistant to the effects associated with carryover contamination, such as in many food, beverage and toiletry products as well as in chemical manufacturing. They are usually not found in pharmaceutical manufacturing or other industries where aseptic processing is being carried out because of major concerns about contamination risks associated with the difficulty of seal in-situ cleaning and resterilizing.

By applying the novel seal design approach discussed earlier in both the diaphragm and O-ring configurations, depending on the specific process needs of the user, the problems associated with tulip or kettle valves can be largely overcome, allowing these very cost effective designs to be used in a greater number of more demanding aseptic processing applications as well as providing better, more reliable service in current applications.

In the particular case of applying inverted seal diaphragm technology, a pedestal 50 is extended up from the first side of the bottom wall 12 through the first inlet 20 and the lip 71 on the inner diameter of the flexing diaphragm 60 is captured by inserting the diaphragm clamping sleeve 40 through the center hole 72 in diaphragm 60 and then inserting it into the central bore 51 of pedestal 50. As described previously, the inner diameter (which may or may not have a lip 71) of the diaphragm 60 is captured between the shoulder 43 of the diaphragm clamping sleeve 40 and the top annular surface 53 of pedestal 50 as retainer nut 140 (FIG. 1) or other tightening devices are applied at the distal end of the diaphragm clamping sleeve 40. If the seal had the diaphragm formed as an integrated part, then, by definition the outer diameter lip of the diaphragm would be an integrated part of the sealing tip and it would not be necessary to further secure it to the sealing tip. If, however, the diaphragm is not formed as an integrated part of the sealing tip, it would need to be captured on the sealing tip as well as illustrated in FIG. 7. Accordingly, in FIG. 7, a threaded collar insert 73 is formed as a part of the diaphragm 60 or is inserted into a mating space within the diaphragm 60 near its outer rim. The further radially this threaded collar can be installed allows greater flexing diaphragm cone radiuses to be used, thus, allowing greater ranges of motion to be achieved. With the end of valve operating rod 130 partially inserted into the central bore 41 of diaphragm clamping sleeve 40, the mating threads 76 of cap 74 affixed on the end of valve operating rod 130 can be mated and tightened onto the threads 75 of collar insert 73. As these threads are tightened, and outer annular surface 77 of the diaphragm 60 is brought into sealing contact with an opposing sealing surface 78 on cap 74, thereby creating an outer seal, which, in combination with the inner seal, seals off and isolates the process from the internal mechanical elements of valve and the surrounding outside environment. In so doing, a seal arrangement is created in a tulip or kettle valve, resulting in a valve with all of the benefits of tulip or kettle valves and the additional benefit of now being a sanitary diaphragm design which can effectively be cleaned and sterilized in-situ and which would now be acceptable for use in aseptic processing applications as well as in all of the traditional applications it has been used for in the past.

It should be noted that the all of the above-described diaphragm arrangements in FIGS. 6(*a*)–6(*c*) and 6(*e*) may be constructed to seal from above the surface 102 as in FIG. 7. This would provide the same advantages to tulip valve constructions mentioned above, while additionally isolating the process from valve elements and the surrounding outside environment.

Figure 8:
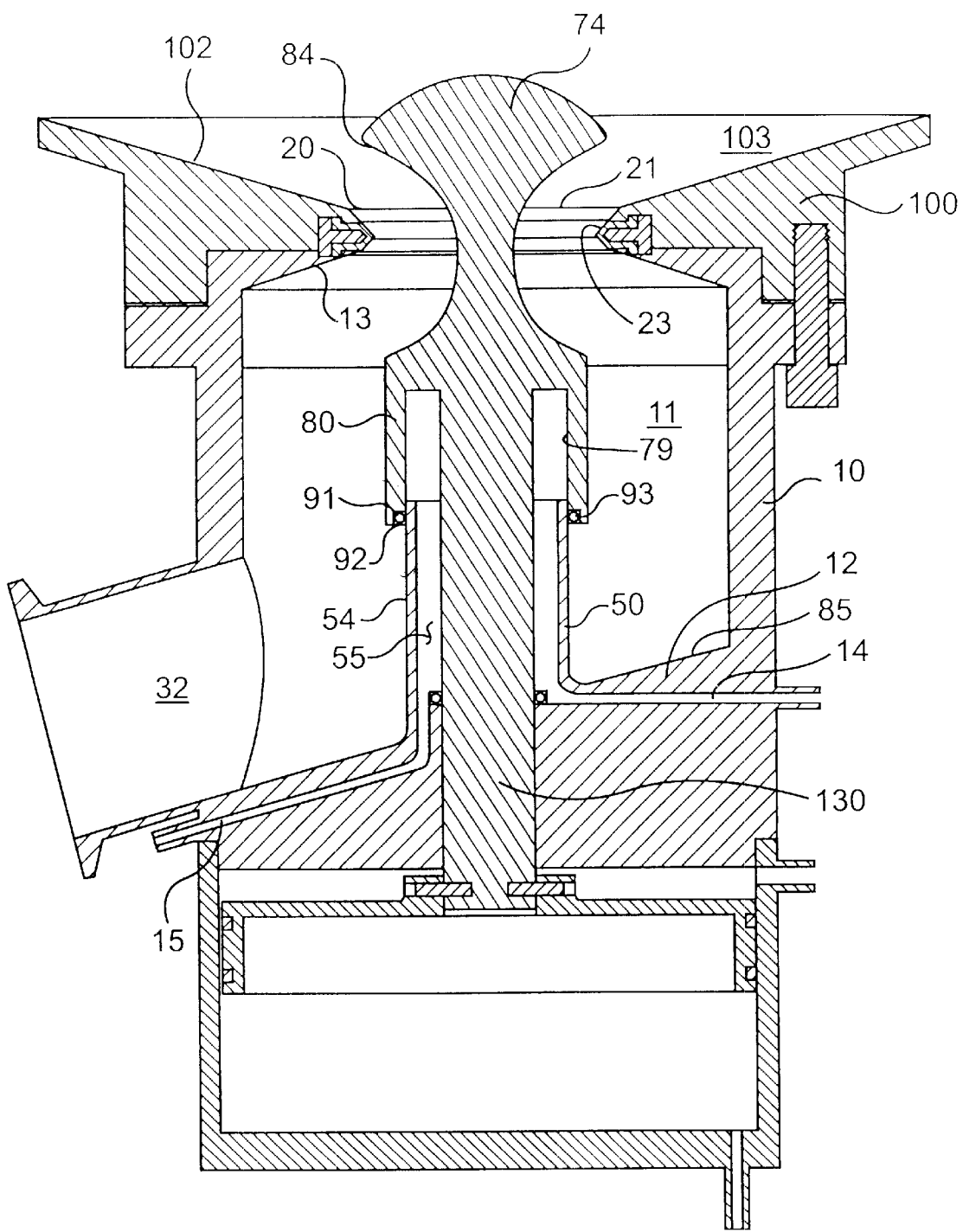
FIG. 8 is a cross-section of an example of the inverted sealing technology applied in an O-ring configuration to a tulip valve design and incorporating CIP/SIP capabilities to the non-process side of the seal as well as the process side.

FIG. 8 is an O-ring seal tulip valve. In the food and beverage industry, many operators continue to used the traditional O-ring-based tulip and kettle valve designs, as described above, because they are, relatively speaking, very inexpensive to install and maintain. Furthermore, for most food and beverage applications where the process is fairly robust and resistant to contamination episodes, the traditional valve designs have provided long periods of service with minimal down time for maintenance. Nonetheless, there have been several incidents in the last few years where these types of valves have been implicated as the source of food and beverage contamination episodes that resulted in serious illness to people. Because these valves are frequently used in process applications that do not lend themselves to the introduction of diaphragm valves, either for physical, chemical or economic reasons, it is still of value to try to improve upon their design so as to further reduce the risk of process contamination events in the future.

Figure 9:
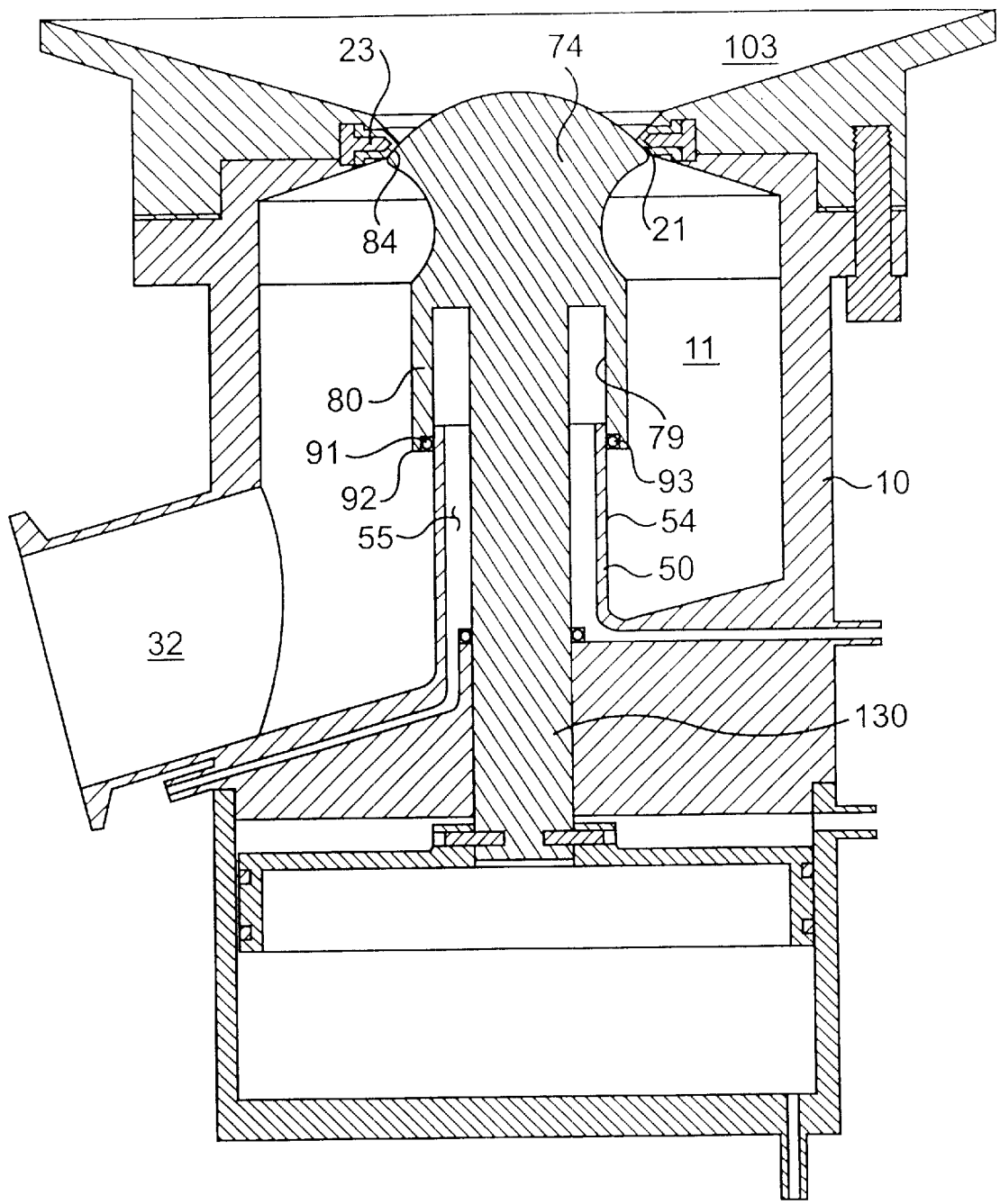
FIG. 9 is a cross-section of an example of the inverted sealing technology applied in an O-ring configuration to a plunger valve design and incorporating CIP/SIP capabilities to the non-process side of the seal as well as the process side.

FIG. 8 is an example illustrating how tulip and kettle valves can be modified and their sealing systems rearranged using inverted seal technology to make them easier to clean and sterilize in-situ, to reduce their threat as a potential source of process contaminants, including threatening microbes. The valve body 10 has a pedestal 50 extending up from the bottom wall 12 of the internal valve cavity 11. Valve operating rod 130 is fitted with or is formed with a cap 74 as in FIG. 7. The cap may itself be capable of forming a seal with the inlet annular sealing surface 21 about the first inlet 20 or it may have integrated into it a sealing element (not shown) or the sealing surface 21 with which it will mate may have a sealing element 23 integrated therewith, as can be seen in FIG. 8. In any case, a seal may be reversibly formed with a mating annular sealing surface 84 about the first inlet 20 on either the upper surface 102 or the lower surface or roof 13 of the cover plate 100 about first inlet 20. In the example illustrated in FIG. 8, the valve operating rod would extend through first inlet 20 and the affixed cap 74 would be raised above the first inlet 20 in the opened condition and be retracted so as to bring the sealing surface 84 of the cap 74, in this instance located on its lower margin, into sealing contact with an upper annular sealing surface 21 located along surface 102 of cover plate 100 and sealing element 23 into sealing contact with each other. In the second case (see FIG. 9), where cap 74 is positioned within the internal cavity 11 of the valve 1, extending the valve operating rod 130 would bring the sealing surface 84, now located on an upper margin of the cap 74, into sealing contact with annular sealing surface 21 located on roof 13 and sealing element 23 about first inlet 20. In both cases (FIG. 8 and FIG. 9), a seal sleeve 80 coaxial with the valve operating rod 130 extends down from the bottom of cap 74 formed or affixed on the end of valve operating rod 130 and mates, along its inside diameter wall 79, with an outside diameter wall 54 of pedestal 50. An O-ring groove 91 is cut into the inside diameter wall 79 of seal sleeve 80 just above a lower margin 92 thereof. An O-ring 93 installed in O-ring groove 91 forms a sliding sealing arrangement with the outside diameter wall 54 of pedestal 50. The benefits of this sealing device is that it is inverted from that found in traditional tulip, kettle, plug, ball and other valve designs, thereby creating a passively draining sealing arrangement that will not tend to collect material in pooling fashion as is found with the prior art. Additionally, an access to the non-process side of the seal can be achieved by boring holes in the valve operating rod as illustrated in FIG. 7 or, as illustrated in FIGS. 8 and 9, by constructing an upper portion XXX of pedestal 50 with an inside diameter larger than an outside diameter of valve operating rod 130, a significantly sized space 55 may be created within the pedestal. Referring to FIGS. 8 and 9, feed and drain passages 14 and 15 can be bored in bottom wall 12 of valve body 10 that will be large enough for cleaning agents, rinses and steam can be fed at high flow rates into the cavity to assure highly effective in-situ cleaning, rinsing and sterilizing of the non-process side of sliding sealing arrangement to be accomplished without clogging. The process side of the valve can be cleaned by including a second inlet opening directly into the valve body internal cavity 11, as illustrated in FIGS. 1 and 2, through which cleaning agents, rinses and steam directly can be supplied. These will be drained from the valve internal cavity by flowing down and out the drain outlet 30. This design has the special benefit of a seal design that can be very effectively cleaned from both the process and no-process sides simultaneously. Because it is best to clean and sterilize an O-ring seal when the mating surfaces are exposed and accessible to the cleaning, rinsing and sterilizing agents, the valve illustrated in FIG. 8 and described above could most effectively be cleaned and sterilized when it is in the open (extended) position. The valve illustrated in FIG. 9 and also described above, could best be cleaned while in the closed position.

It should be noted that, once the concept of inverted seal technology is understood, many other variations on the concept will become apparent to someone knowledgeable in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A valve for draining a process from a tank or conduit, comprising:
    a valve body;
    a first inlet formed in said valve body;
    an outlet formed in said valve body;
    an internal cavity formed in said valve body and in communication with said first inlet and said outlet, said internal cavity being at least partly defined by a bottom wall having a first side facing the process and a second side facing away from the process;
    a sealing tip, said sealing tip having a first side facing the process and a second side facing away from the process;
    a valve operating rod, said valve operating rod being connected to said sealing tip and movable to move said sealing tip into sealing contact with an annular surface about said first inlet into said internal cavity to form a first seal for sealing the internal cavity from communication with the process;
    a second seal, said second seal being a dynamic seal and being formed between said first side of said bottom wall of said internal cavity and said second side of said sealing tip to isolate said valve operating rod and the surrounding outside environment from the process.

2. The valve according to claim 1, wherein said bottom wall of said internal cavity includes a hole therethrough for receiving said valve operating rod, said bottom wall including a first portion around said hole being raised with respect to a second portion of said bottom wall immediately adjacent thereto, said first portion forming said first and second sides of said bottom wall and being sealed by said seal.

3. The valve according to claim 2, wherein said raised portion is a cylindrical portion having an outside diameter forming said first side of said bottom wall, and said sealing tip includes a sealing sleeve having an inside diameter for forming said second side of said sealing tip and for sliding on said outside diameter of said cylindrical portion, said second seal being located between said sealing sleeve and said cylindrical portion.

4. The valve according to claim 1, wherein a bottom most surface of said bottom wall has a continuously declining path toward said outlet to promote the drainage of the process out of said internal cavity.

* * * * *